(12) United States Patent
Markillie

(10) Patent No.: US 8,116,348 B2
(45) Date of Patent: Feb. 14, 2012

(54) GAS LASER DEVICE

(75) Inventor: Gavin Markillie, Kingston upon Hull (GB)

(73) Assignee: Rofin-Sinar UK Ltd., Kingston Upon Hull (GB)

( * ) Notice: Subject to any disclaimer, the term of this patent is extended or adjusted under 35 U.S.C. 154(b) by 0 days.

(21) Appl. No.: 12/255,236

(22) Filed: Oct. 21, 2008

(65) Prior Publication Data

US 2009/0110016 A1   Apr. 30, 2009

(30) Foreign Application Priority Data

Oct. 25, 2007   (EP) .................................. 07119271

(51) Int. Cl.
*H01S 3/03* (2006.01)
(52) U.S. Cl. ........................................... 372/64; 372/95
(58) Field of Classification Search .................... 372/64, 372/95
See application file for complete search history.

(56) References Cited

U.S. PATENT DOCUMENTS

| 4,719,639 | A |   | 1/1988 | Tulip |
| 5,048,048 | A |   | 9/1991 | Nishimae et al. |
| 5,335,242 | A |   | 8/1994 | Hobart et al. |
| 5,936,993 | A | * | 8/1999 | Opower et al. ............ 372/93 |
| 2002/0110158 | A1 | * | 8/2002 | Stamm et al. ............ 372/19 |

* cited by examiner

*Primary Examiner* — Tod T Van Roy
(74) *Attorney, Agent, or Firm* — Downs Rachlin Martin PLLC

(57) ABSTRACT

A gas laser device is presented that produces a near diffraction limited round beam exiting the discharge vessel. Through the use of a simple focusing system, additional waveguide strip and a spatial filter in conjunction with the new asymmetric hybrid planar waveguide resonator, a round diffraction limited beam can be produced exiting the discharge vessel. Furthermore, a second and very similar design is presented that allows for spatial filtering to take place directly outside of the discharge vessel, thereby enabling filtering of the beam to be an added option.

13 Claims, 10 Drawing Sheets

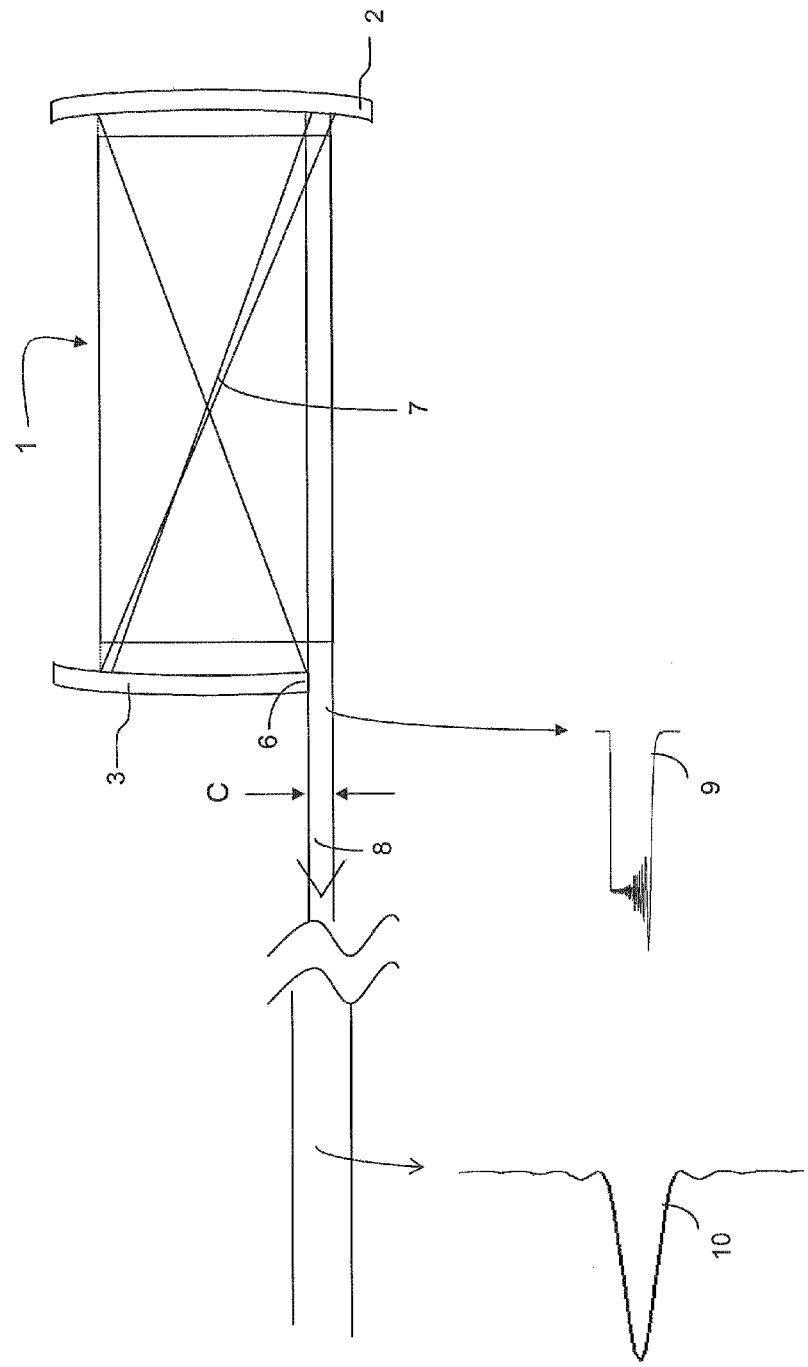

GAS LASER DEVICE

RELATED APPLICATION DATA

This application claims the benefit of foreign priority under 35 U.S.C. §119(a)-(d) from European Patent Application No. 07119271.0, filed Oct. 25, 2007, and titled "Gas Laser Device," which is incorporated by reference herein in its entirety.

FIELD OF THE INVENTION

The present invention generally relates to the field of gas discharge lasers, particularly, but not limited to, an RF excited slab discharge laser vessel, operating in a wavelength region from 3 to 12 microns. In particular, the present invention is directed to a gas laser device.

BACKGROUND

FIG. 1(a) is a perspective view of a conventional rectangular asymmetric hybrid planar waveguide gas laser device 1 consistent with the prior art presented in U.S. Pat. No. 5,335,242 used to generate laser output wavelengths from 3 to 12 microns in length. To generate gain within the laser cavity formed between the resonator mirrors 2, 3, a Radio Frequency gas discharge is created between two metallic planar electrodes 4 often referred to as slabs; by exciting a Radio Frequency discharge in the narrow gap 5 with dimension A between the electrodes. For an overview of this technology refer to U.S. Pat. No. 4,719,639. The laser has vertical A and horizontal dimensions B different from each other, and laser resonator mirrors 2, 3 which are concave spherical mirrors to form a negative branch unstable resonator in the wider lateral free-space direction B, whereupon the beam is out-coupled past the hard edge 6 of the mirror 3 which has the lowest radius of curvature of the two resonator mirrors. In the much narrower transverse direction A the resonator mirrors 2, 3 in conjunction with the planar electrodes 4 form a waveguide. A plan view of the laser is given in FIG. 1(b) showing the free-space unstable direction, and a sectional view is shown in FIG. 1(c) showing the waveguide direction of the resonator. The following discussion outlines the limitations of conventional correction schemes to format the output beam from an asymmetric hybrid planar waveguide laser resonator, into a round and near diffraction limited beam; which is a prerequisite for most laser process applications.

Referring to FIG. 1(b), the internal resonator beam 7 is out-coupled from the resonator past the hard edge 6 of mirror 3, generating a beam 8 with a profile 9 in the free-space unstable direction which is often referred to as a top-hat. This near-field beam will accordingly need to be propagated into its far-field where-upon its profile 10 has a central maxima with adjacent side lobes which can then be removed using a spatial filter to give a Gaussian-type near diffraction limited beam profile. Propagation into the far-field is produced by either allowing the beam to naturally propagate, or to generate a focus using either a concave mirror or a positive lens. In general the choice of resonator in the free-space unstable direction is confocal in type, dictating that the out-coupled beam 8 in that direction is collimated. In order to achieve suitable output couplings from these types of lasers operating at a chosen wavelength in the range 3 to 12 microns, the beam width C in the free space direction is generally of a size such that the distances required to allow the collimated beam 8 to naturally propagate into the far-field, are of the order of many metres. This dictates that for most designs the out-coupled beam 8 in the free space direction must be focused, and therefore requires at least two additional external mirrors to turn the beam and fold it back along the length of the external structure of the gas laser discharge vessel. This method keeps the design as compact as possible, while also negating the need to use high focusing power optics to generate the free space far-field; whereupon large Irradiance levels would be present in the filtered side lobes and a very high degree of positional accuracy would be required for mounting of the spatial filter to avoid thermal damage.

Depicted in FIG. 1(c) is the waveguide direction of the resonator. As mentioned above, this direction is orthogonal to the free-space unstable direction of the resonator. The waveguide beam 11 is generated in the waveguide gap 5, with a width A from 1-2 mm, dictating that the exiting near-field waveguide beam profile 12 is highly divergent compared with the wider, collimated beam in the free space unstable direction, however, unlike the free-space unstable beam, the profile shape in both the near 12 and the far field 13 is near Gaussian, and therefore does not require spatial filtering. In general, the exiting waveguide beam 11 is allowed to propagate to a distance whereupon its size is equal to that of the free-space beam. The wave-front radius of curvature (divergence) of the waveguide beam is then corrected to match that of the free space beam using a cylinder mirror/lens or an angled spherical mirror, this correction occurring either prior to, or after the free-space beam has been spatially filtered. It is common practice to use the afore mentioned two folding mirrors that are used to fold the beam back along the length of the external structure of the gas laser discharge vessel, to perform some, or all of the correction in the waveguide direction. However, in order to achieve the required correction within the limitation of keeping the corrective scheme no longer than the length of the laser discharge vessel, it is often required that additional beam folds be used. Such designs often require additional frameworks and optical mounting systems, driving up costs and overall structural weight. Added to these issues, is the need to allow for variations in both the resonator beam characteristics and tolerances in the optical powers of the corrective system, dictating that the corrective system must be adjustable to some degree, both in the positioning and the angle of incidence of its component corrective optics.

SUMMARY OF THE DISCLOSURE

Accordingly, it is the object of one aspect this invention to eliminate the above-described difficulties and draw-backs accompanying the required beam correction of a conventional asymmetric hybrid planar waveguide device. More specifically, an object of an aspect of the present invention is to provide a gas laser vessel operating with a asymmetric hybrid planar waveguide resonator that produces a near diffraction limited round beam that does not require any further external correction. Such a device, in comparison with an asymmetric hybrid planar waveguide laser having a conventional correction system, will be simpler in construction, lower in cost and lighter in weight.

According to the present invention there is provided an apparatus and method as set forth in the appended claims. Other features of the invention will be apparent from the dependent claims, and the description which follows.

According to a first aspect of the invention, a gas laser discharge vessel operates with an asymmetric hybrid planar waveguide resonator, an optical focusing system/focusing optic and an additional waveguide strip length. The additional waveguide strip and the focusing system/focusing optic preferably act upon the output beam from the hybrid planar-waveguide resonator to form a beam waist in the free-space unstable direction at the exit of the waveguide strip that matches the dimensions of the orthogonal waveguide beam waist formed at that position, creating a round output. Moreover, the free-space unstable beam is now in what is termed its far-field, and can be spatially filtered at a point near to or just after the exit of the additional waveguide strip, creating a near diffraction limited round beam that does not require any further external correction after it has exited the discharge vessel.

According to a second aspect of the invention, a gas laser discharge vessel operates with an asymmetric hybrid planar-waveguide resonator, an optical focusing system/focusing optic and an additional waveguide strip length. The additional waveguide strip and the focusing system/focusing optic preferably act upon the output beam from the asymmetric hybrid planar-waveguide resonator to form a beam waist in the free-space unstable direction a short distance after the beam has propagated from the additional waveguide strip.

The position of the free space beam waist can be chosen to be internal or external to the discharge vessel, the later option having the advantage that filtering may be added after construction and sealing of the discharge vessel. The size and position of the beam waist may also be preferably set such that the diverging waveguide beam size is either matched at that position, or at a short distance after the free space beam waist has been formed. The waveguide beam divergence can then be corrected to equal that of the free-space unstable beam using a cylinder mirror/lens positioned at the position where the beam sizes match, generating a round beam. Dependant upon the position of the free space beam waist and the position where the beam is round, the corrective cylinder mirror/lens may be placed internal or external to the discharge vessel.

Further to the first and second aspects of the invention, the asymmetric hybrid planar waveguide resonator design is preferably purposely catered for positioning of the additional planar waveguide strip parallel and adjacent to the resonator planar waveguide discharge. Specifically, a laser whereby the asymmetric hybrid planar-waveguide is preferably configured as a two mirror negative branch resonator which out-couples the beam past the resonator cavity mirror having the largest radius of curvature. This then preferably allows the focusing system to be a simple, spherical concave mirror, operating at near normal incidence to the out-coupled beam, in-coupling the resonator-output-beam into an additional planar waveguide strip that is both parallel and adjacent to the resonator's planar waveguide discharge. Moreover, an asymmetric hybrid planar waveguide laser resonator as mentioned above, operating with a configuration that is near to, or exactly at the point where it is deemed a confocal resonator, which aids in the efficient extraction of gain from a rectangular slab discharge; the effective geometric source for the resonator output beam being near to or exactly co-incident with the resonator's theoretical confocal point.

Furthermore, an asymmetric hybrid planar-waveguide resonator, that in this second aspect of the resonator, is preferably configured as a two mirror positive branch resonator which out-couples the beam past the resonator cavity mirror having a concave radius of curvature. This again allows the focusing system to be a simple, spherical concave mirror, operating at near normal incidence to the out-coupled beam, in-coupling the resonator-output-beam into an additional planar waveguide strip that is both parallel and adjacent to the resonator's planar waveguide discharge. Again, this resonator can operate with a configuration that is near to, or exactly at the point where it is deemed a confocal resonator, which as before, aids in the efficient extraction of gain from a rectangular slab discharge; the effective geometric source for the resonator output beam being near to or exactly co-incident with resonator's theoretical confocal point.

In one implementation, the waveguide strip length has transverse dimensions that are of a suitable size to efficiently in-couple the output beam from the planar waveguide resonator of the first aspect.

The waveguide strip of the first aspect whose length in conjunction with the power of the focusing system/optic is preferably to be chosen such that the central lobe of the beam waist formed in the free-space unstable direction at the end of the waveguide strip equals that of the orthogonal waveguide beam waist.

The waveguide strip length may include a spatial filter positioned near to or just after the waveguide strip exit that acts to remove the secondary side lobes of the beam in the free-space unstable direction, thereby giving a near diffraction limited round beam.

In another implementation, the waveguide strip length of the second aspect has a length in conjunction with the power of the focusing system/optic to be chosen such that a beam waist in the free space direction is formed a short distance after the beam has propagated from the additional waveguide strip, and is preferably contained within or external to the gas laser vessel.

Spatial filtering of the secondary side lobes belonging to the free-space unstable beam, near to or at the beam waist position may be provided in order to generate a diffraction limited beam.

The size and position of the beam waist may also be set such that the diverging waveguide beam size is either matched at that position, or at a short distance after the free space beam waist has been formed. The waveguide beam divergence can then be corrected to equal that of the free-space unstable beam using a cylinder mirror/lens positioned at the position where the beam sizes match, generating a round diffraction limited beam.

The asymmetric hybrid planar-waveguide resonator may be a two mirror negative branch resonator which out-couples the beam past the resonator cavity mirror having the largest radius of curvature.

The asymmetric hybrid planar-waveguide resonator may be a two mirror positive branch resonator which out-couples the beam past the resonator cavity mirror having a concave radius of curvature.

The asymmetric hybrid planar-waveguide resonator may be adapted to operate with a configuration that is near to, or exactly at the point where it is deemed a confocal resonator, which aids in the efficient extraction of gain from a rectangular slab discharge; the effective geometric source for the output beam preferably being near to or exactly co-incident with the resonator's theoretical confocal point.

The focusing system/optic may contain mirror surfaces or a surface adjustable in angle, such that the waveguide strip longitudinal axis can be arranged parallel to the longitudinal axis of the slab waveguide discharge.

The asymmetric hybrid planar-waveguide resonator may incorporate a single optical component that performs as one of the resonator mirrors belonging to the asymmetric hybrid planar waveguide resonator, as well as also acting as part or all of the focusing system/optic mentioned above.

According to an aspect of the present invention, there is provided a gas laser comprising:
  two substantially parallel electrode plates forming a waveguide operable to focus and reflect a resonator beam;
  excitation means operable to cause a gas discharge;

first and second focusing/reflecting means facing each other between the electrode plates; and third focusing/reflecting means operable to direct the resonator beam to an exit of the gas laser.

The resonator beam is preferably developed by the electrode plates and the first and second focusing/reflecting means. Gain is extracted from the gas discharge as light passes therethrough, giving rise to the resonator beam.

The first, second and/or third focusing/reflecting means may be curved reflectors.

The gas laser preferably includes an additional waveguide element, or waveguide strip, preferably adjacent and preferably coplanar to the waveguide formed by the electrode plates. The third focus/reflecting means are preferably operable to focus the exiting resonator beam to form a beam waist, preferably in a free-space unstable direction, substantially at or close to the exit of the additional waveguide element. The beam waist may be formed beyond the additional waveguide element.

The additional waveguide is preferably operable to constrain the exiting resonator beam in the waveguide direction. The additional waveguide is preferably located between the third focusing/reflecting means and the exit of the gas laser.

The third focus/reflecting means are preferably operable to focus the exiting resonator beam to form a beam waist substantially the same size as a size of the beam waist in the waveguide direction, which size is preferably a separation distance of plates of the additional waveguide element. The third focus/reflecting means may be adjustable in angle. The third focus/reflecting means may be a part of one of the first or second focus/reflecting means.

The laser may include spatial filtering means, adapted to remove side-lobes of the exiting resonator beam, preferably in the free-space direction. Preferably, the spatial filtering means are located at or close to the exit of the laser.

The laser may be an asymmetric planar-waveguide resonator laser.

The first and/or second focus/reflecting means in the wider lateral direction of the laser discharge are preferably chosen to form a near confocal or confocal resonator.

The invention extends to a resonator for a gas discharge laser, said resonator incorporating the electrode plates and focus/reflecting means of the previous aspect.

According to another aspect of the present invention, there is provided a method of creating a laser resonator beam, said method including:

causing a discharge in a gas by radio frequency excitation of the gas using substantially parallel electrode plates;

extracting gain from light generated by reflecting and focusing the discharge between first and second focus/reflecting means; and guiding the resonator beam to an exit using third focus/reflecting means.

All of the features described herein can be combined with any of the above aspects, in any combination.

For a better understanding of the invention, and to show how embodiments of the same may be carried into effect, reference will now be made, by way of example, to the accompanying diagrammatic drawings in which:

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1(b) is a plan view of the prior art laser presented in FIG. 1(a) showing the free-space unstable direction of the laser resonator;

DETAILED DESCRIPTION

Figure 1A:
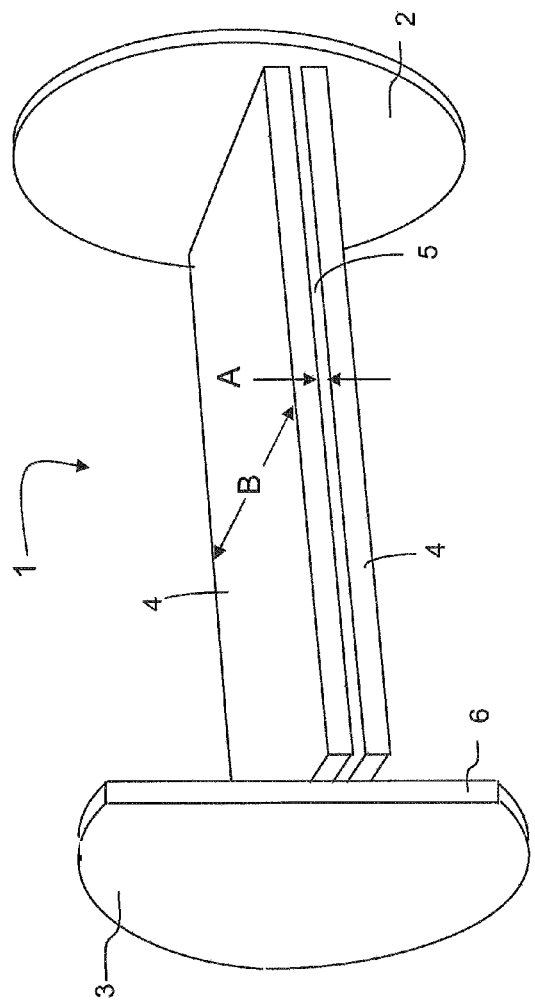
FIG. 1(a) is a perspective view of a conventional prior art rectangular asymmetric hybrid planar waveguide gas laser device of the type disclosed in U.S. Pat. No. 5,335,242.
Figure 1C:
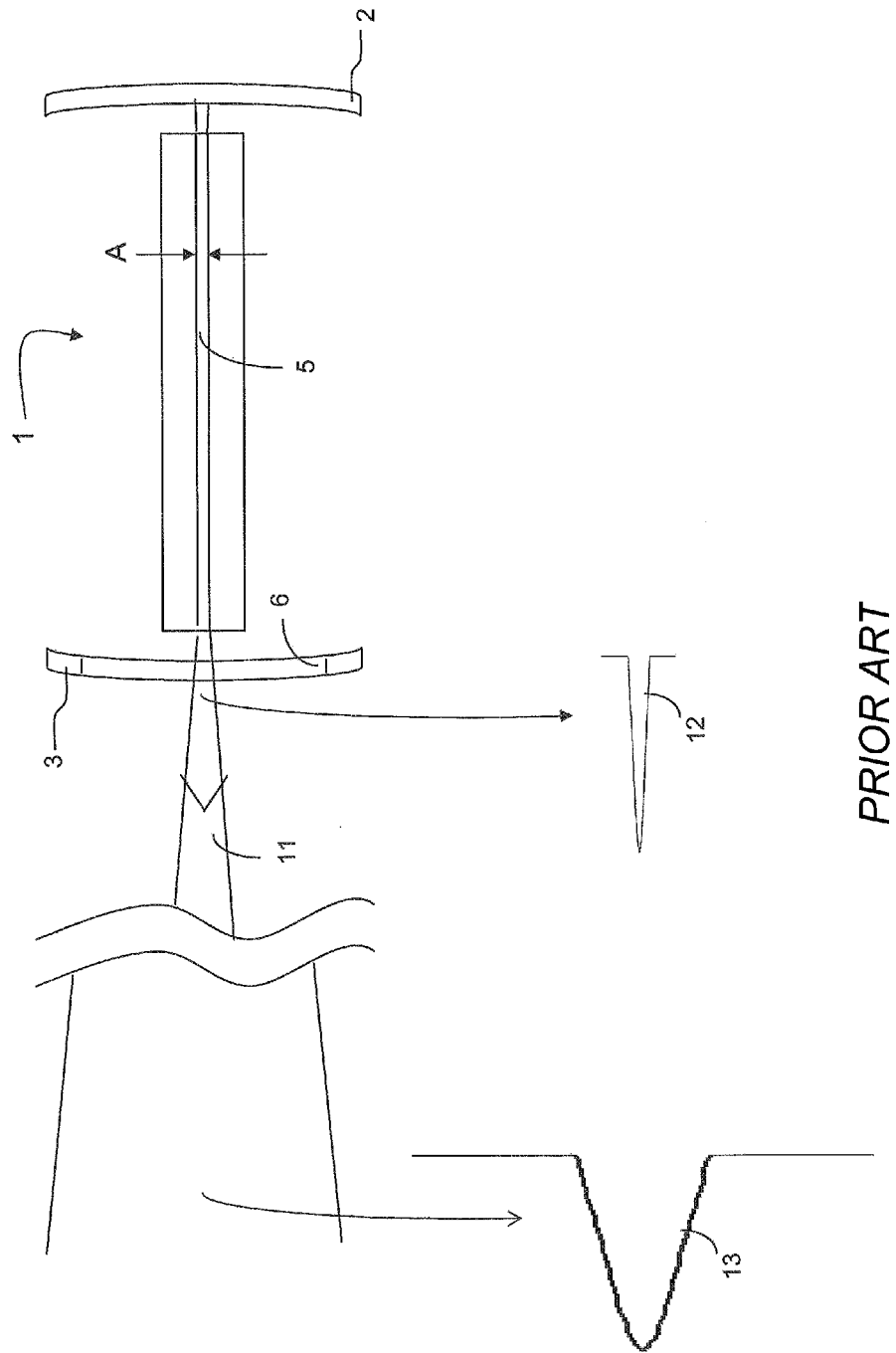
FIG. 1(c) is a sectional view of the prior art laser presented in FIG. 1(a) showing the waveguide direction of the laser resonator.
Figure 2A:
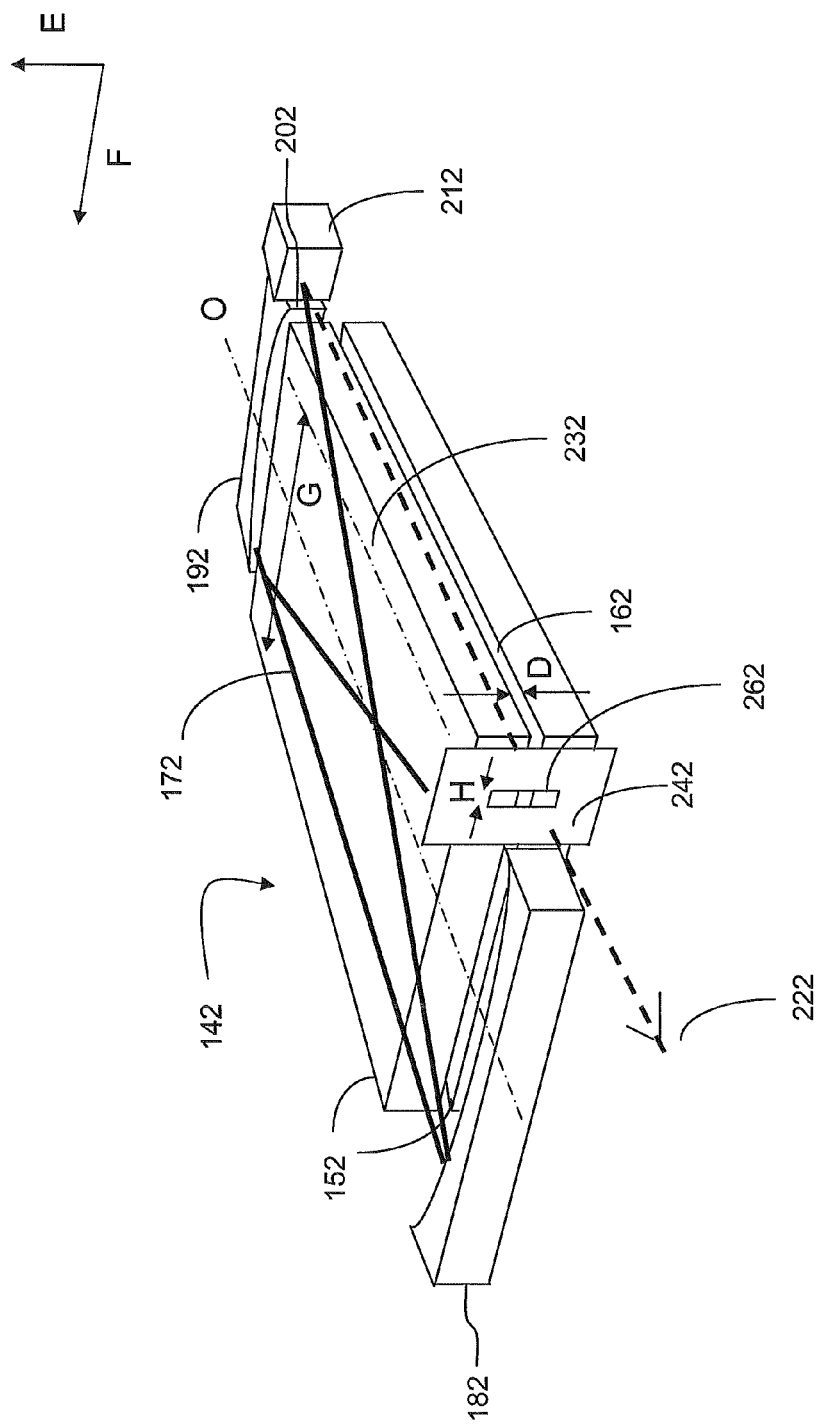
FIG. 2(a) is a perspective view of the optical and discharge structure of one embodiment.

One embodiment of this invention will be described with reference to the accompanying drawings, namely FIG. 2(a), FIG. 2(b) and FIG. 2(c). FIG. 2(a) shows a perspective drawing of the optical and discharge structure of one embodiment; the gas discharge structure 142 comprises two metallic planar, rectangular electrodes 152, with the Radio Frequency excited gas discharge running in the narrow gap 162 between the electrodes. The width D of the gap 162 is usually from 1-2 mm, with the gap width D maintained to within 100 microns over the entirety of the discharge structure. This uniform gap in conjunction with the flat metallic surface of the electrodes also acts to form a waveguide for the laser resonator in the narrow transverse dimension E of the resonator. In the wider lateral free-space dimension F of the resonator defined by the width of the slab G, or alternatively the width of the resonator mirrors placed at the ends of the discharge, the laser resonator operates in this free-space direction as an asymmetric unstable resonator, with the laser beam out-coupled past the hard edge of one of the mirrors. A solid line ray-trace of the resonator free space beam 172 is shown in FIG. 2(a).

As mentioned above, at either end of the discharge structure are placed the resonator mirrors. Both these mirrors have a spherical concave radius of curvature machined upon the surfaces that face into the gas discharge, and form a confocal or near-confocal negative branch, unstable optical system in the lateral free-space dimension F. The resonator mirror having the smallest radius of curvature 182 is positioned at the discharge end where the beam exits the discharge structure and the laser vessel. At the opposite end of the discharge is the resonator mirror 192 which has the largest radius of curvature, it is this mirror 192 that has a hard edge 202, enabling out-coupling of the beam from the resonator. Adjacent to mirror 192 is a third mirror 212 having a spherical concave radius of curvature machined upon the surface facing into the discharge. The angle of the third mirror 212 is such that it takes the output from the laser resonator which is angled to the optical axis of the laser resonator O, and folds the output beam 222 back along an adjacent section of the gas discharge which is parallel to the optical axis of the laser resonator O, this section of the discharge 232 now acting as an additional waveguide strip. Just after the exit of the additional waveguide strip 232, a spatial filter 242 is positioned such that it acts to spatially filter the out-coupled beam in the free-space direction. In general, the spatial filter is a reflective device, most likely metallic in nature but not necessarily, with a slot 262 of similar width H to the waveguide gap size D machined in it, which allows the central maxima of the free-space beam to pass through, while also reflecting the unwanted free-space side-lobes out of the main beam. It is desirable to place the spatial filter a few centimetres back from the exit of the waveguide in order that the reflected free-space side-lobes can be directed away from the optical path of the resonator thereby stopping optical 'feedback', and to also avoid possible flash-over from the Radio Frequency excited discharge to the metallic structure of the filter.

Figure 2B:
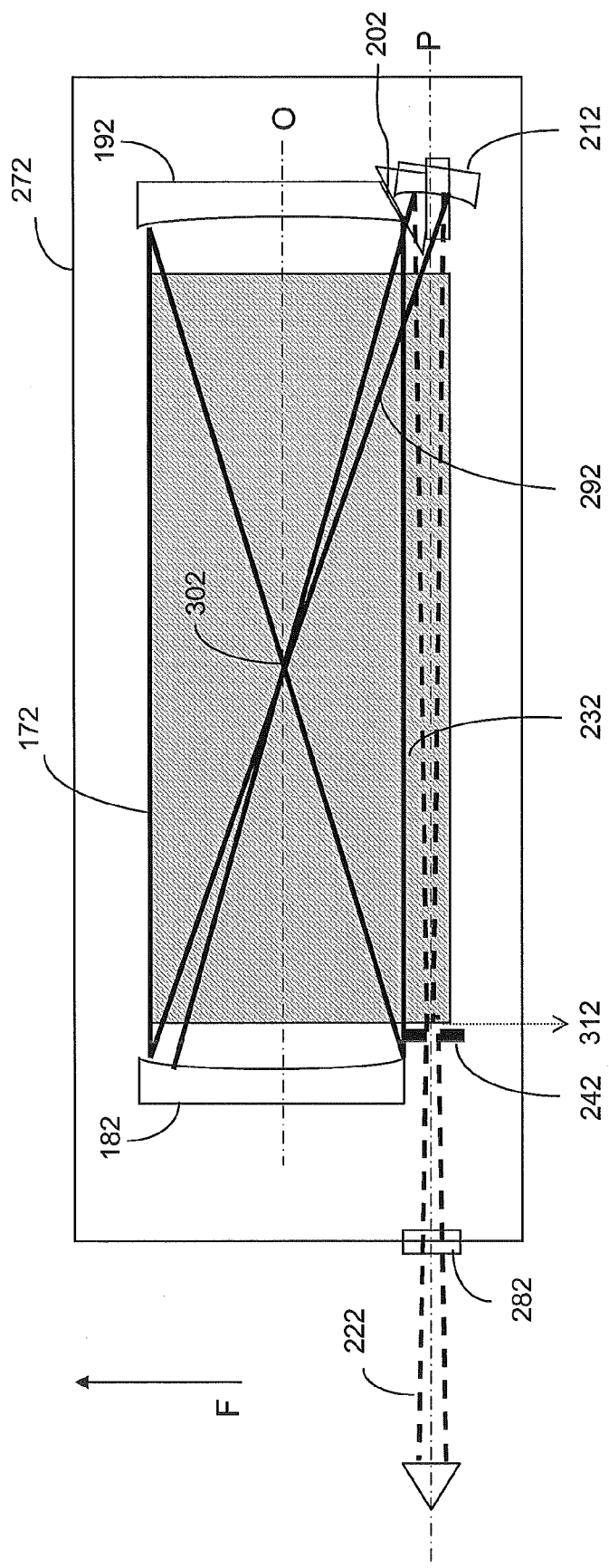
FIG. 2(b) is a plan view of the embodiment presented in FIG. 2(a)
Figure 2C:
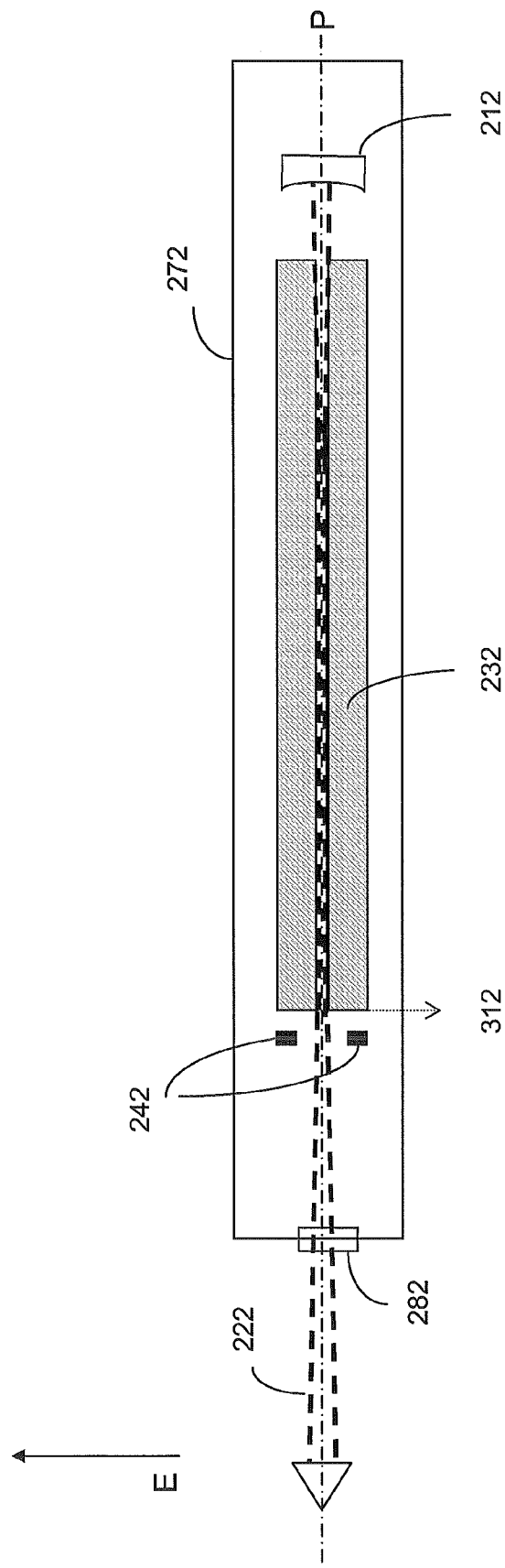
FIG. 2(c) is a sectional view of the embodiment presented in FIG. 2(a)

FIG. 2(b) is a plan view of the embodiment presented in FIG. 2(a) and shows the resonator and correction in the wider lateral free-space unstable direction, and also includes an outline of the discharge vessel 272, and the vessel optical window 282 within the vessel wall that allows the output beam to propagate from the discharge vessel. The free-space unstable beam 172 within the resonator is again represented as a solid line ray-trace. In the present invention, the output beam 222 exits the laser resonator at the rear of the discharge vessel 272 before being folded back along the length of the discharge vessel by the third mirror 212. The resonator is designed such that the beam 222 leaving the resonator is divergent, originating from a virtual point source 302 near to the discharge centre. Through the correct choice of the radius of curvature of the third mirror 212, and the degree of output coupling from the resonator the resultant beam 222 has a beam waist at the exit 312 of the additional waveguide strip 232, which when filtered produces a near diffraction limited free-space beam that is equal in size to that of the orthogonal waveguide beam waist at the exit 312 of the additional waveguide strip 232 shown in FIG. 2(c) which is a sectional view of the laser discharge vessel taken along the axis line P in FIG. 2(b). Thus the beam 222 exiting the laser discharge vessel 272 is both round and filtered and requires no additional correction. Referring back to FIG. 2(b), the reason that the free-space beam can be filtered at the exit of the additional waveguide strip 232 is that the free-space beam is termed as being in its far-field, a situation that is not possible to produce internal to the discharge vessel when employing a conventional prior art planar waveguide laser resonator and conventional correction, as was discussed in the section outlying the background to this invention. Another important point to note is that a conventional asymmetric planar waveguide laser can be configured such that the beam exiting the laser resonator is round; namely the output free-space unstable and waveguide beam sizes are the same; such a configuration was presented in U.S. Pat. No. 5,048,048 detailing a microwave excited gas discharge. After propagation of the exiting divergent beam from the exit of the planar waveguide resonator, dependant upon the size of the waveguide beam waist and the chosen wavelength the laser operates at, the beam can in theory be spatially filtered in the free-space direction at distances of less than 0.3 m from the exit of the waveguide without the need to focus the free-space unstable beam. However, this approach is limited to lasers operating at powers below 200 Watts, because its practical application is constrained by the allowable lateral width of the planar waveguide discharge. The reason for this constraint is that the fractional output coupling of the resonator is approximately given by the width of the free-space beam exiting the resonator past the hard edge of the output mirror, divided by the width of the planar waveguide discharge. Ideally, fractional values of around 0.06-0.2 commonly give the most efficient power extraction from these types of planar waveguide gas discharge laser resonators operating at wavelengths from 3 to 12 microns. Unfortunately, as fractional values start to drop below 0.06, the power extraction efficiency drops quite dramatically. This trend limits the practical application of this prior art approach to planar waveguide gas discharges having a lateral width of no greater than 20-30 mm, dependant upon the waveguide gap size chosen, which usually ranges from 1-2 mm. It should also be noted that irradiance levels from this type of planar waveguide laser as presented in U.S. Pat. No. 5,048,048 are very high and can lead to optical damage on the discharge vessel's optical window when employing commonly used materials for the window substrate that operate in the 3 to 12 micron wavelength region. This may also seem to be the case in the embodiment of present invention discussed above. However, in the case of the present invention, referring back to FIG. 2(a), FIG. 2(b) and FIG. 2(c) the metallic electrodes 152 are shown to be rectangular with the additional waveguide strip 232 running their entire length; this does not necessarily have to be the case for all designs and power levels. As planar waveguide gas discharge lasers scale in power, generally the width and length of the planar waveguide electrodes increase to generate greater area gain. This area scaling of the discharge active region can lend itself to an additional waveguide strip length that does not run the entire length of the planar waveguide electrodes 152. Thus a round beam can be generated at a significant distance from discharge vessel's optical window 282, such that the diverging output beam's size at the discharge vessel's optical window 282 has increased to a value whereupon Irradiance levels no longer cause optical damage. Naturally the realisation of this scheme requires the use of a spatial filter 242 that is electrically isolated from the Radio Frequency discharge in order to place it close to the exit of the additional waveguide strip 232, and designed such that the filtered beam components cannot optically 'feedback' into the laser resonator.

Figure 3A:
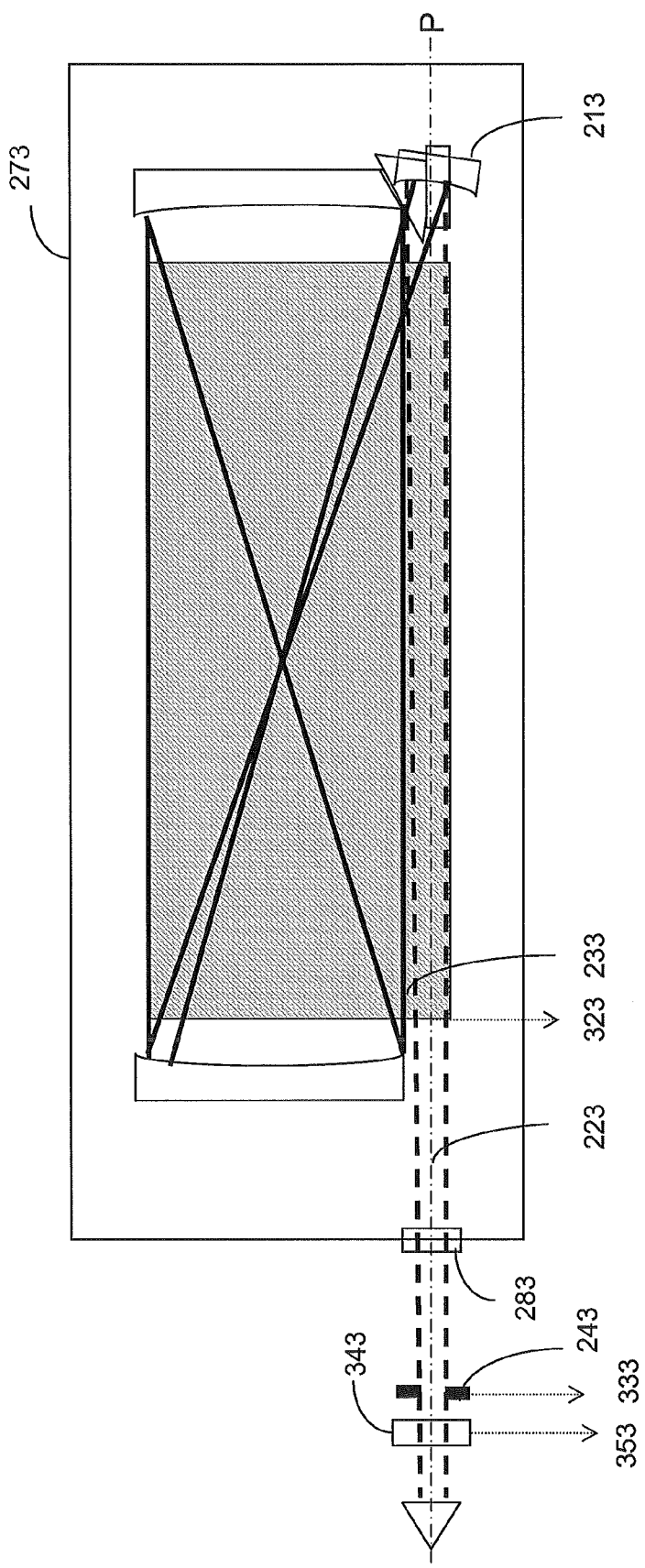
FIG. 3(a) is a plan view of a derivative of an embodiment.
Figure 3B:
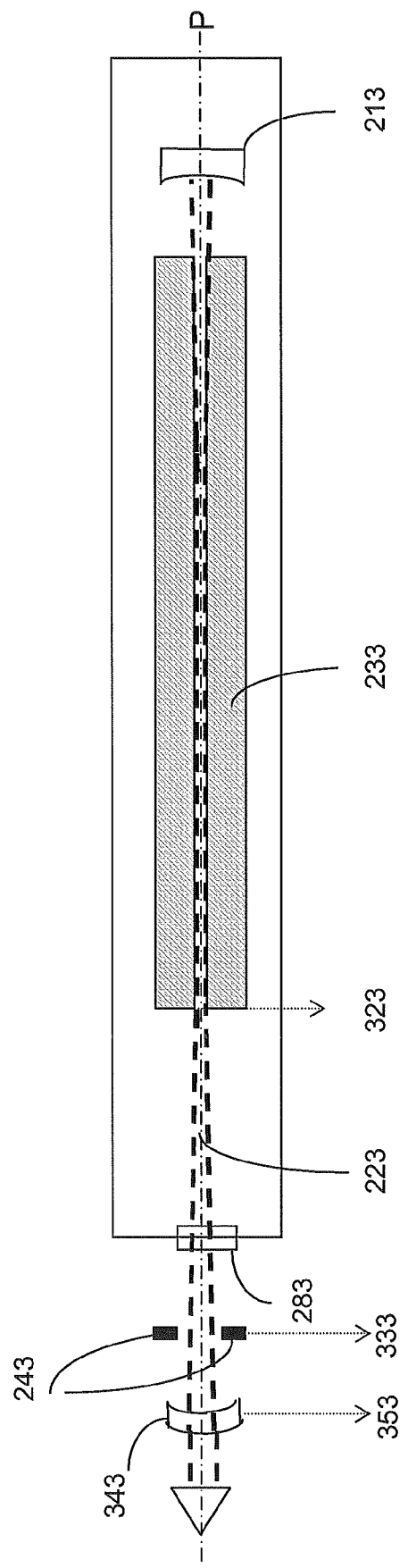
FIG. 3(b) is a sectional view of the derivative of the embodiment.

FIG. 3(a) shows the plan view for a derivative of an embodiment of the present invention. In this variant the third mirror 213 has a radius of curvature such that the resultant output beam 223 in the free-space unstable direction has a beam waist not at the exit 323 of the additional waveguide strip 233 as in the prior embodiment, but at a position 333 a short distance after the beam has exited the additional waveguide strip. This approach enables a wider variety of resonator out couplings and additional waveguide strip lengths to be considered as the design is no longer constrained to having the beam sizes equal at the end of the additional waveguide strip. It should also be noted that position 333 can be chosen to be either inside or outside the confides of the discharge vessel. A potential advantage to having position 333 set outside the confides of the discharge vessel, is that filtering can be offered to the end user as an option. In contrast, a disadvantage to having position 333 outside the confides of the discharge vessel is that average laser output powers for Carbon Dioxide gas laser variants of this invention are limited to values no greater than 200 W, due to constraints upon the allowable Irradiance levels formed on the discharge vessel's output window 283 when using commonly available materials for the window substrate. Directly at position 333 is placed a spatial filter 243, which acts in the free-space direction to generate a near diffraction limited beam in the free space direction. The spatial filter slit width being approximately equal to 3*w0 of the free-space beam's central maxima, where w0 is the traditional 1/e2 beam radius. Shown in FIG. 3(b) is a sectional view of the laser discharge vessel taken along the line P in FIG. 3(a), demonstrating the output beam 223 diverging in the waveguide direction as it exits the additional waveguide strip 233. In order to correct the waveguide divergence such that it matches the divergence of the orthogonal free-space beam waist, a cylindrical lens 343 is placed at position 353 which is where the beam sizes in the orthogonal directions are equal. The focal length of the cylindrical lens 343 is chosen such that the different divergences are then matched, creating a round diffraction limited beam. It should be noted that dependant upon the beam waist size and position chosen for the free space direction, position 353 can be either at position 333 or at a further distance. This dictates that this corrective optic could be internal to the discharge vessel if position 333 is internal to the discharge vessel, and could potentially take on the role of sealing the device, such that optics 343 and 283 are one and the same optic.

Figure 4:
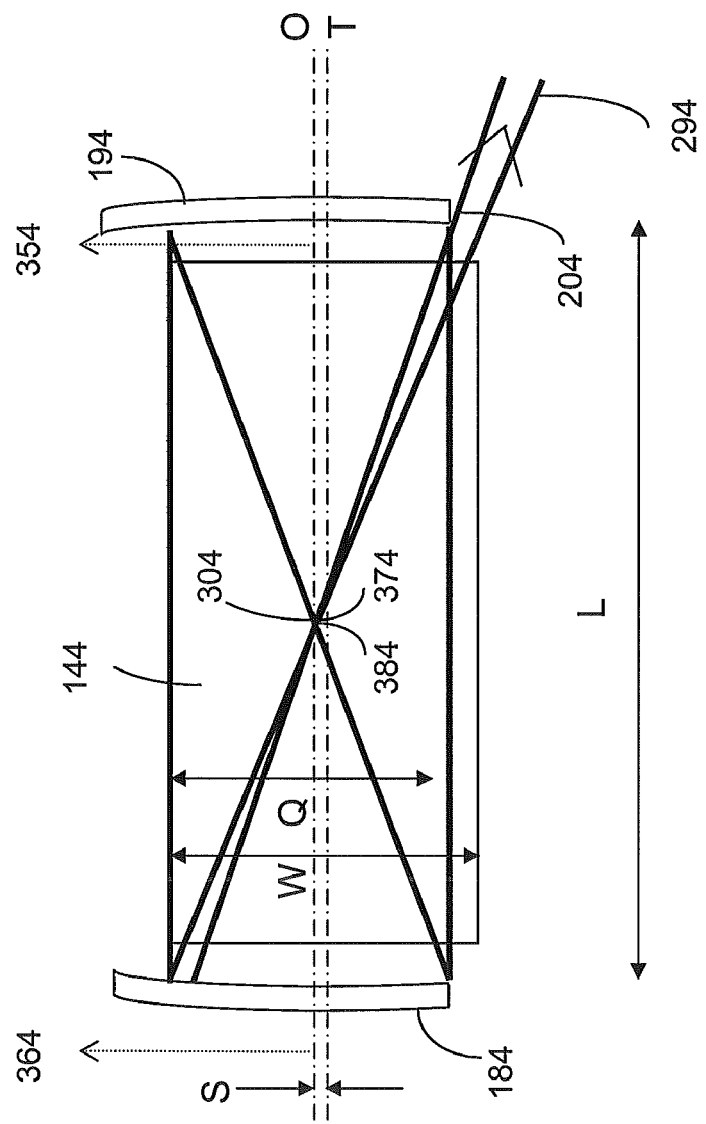
FIG. 4 is a plan view of the invented asymmetric hybrid planar waveguide resonator operating in the negative branch confocal configuration.

To better describe the resonator of this invention, the confocal variant of the invented asymmetric negative branch resonator is presented in FIG. 4 as a plan view of the free-space direction; with the corrective third mirror of the invention not shown. In the free-space direction a confocal or near confocal asymmetric resonator operates, formed between two mirrors 184 and 194 with a radius of curvature formed on each mirror, the formed surfaces facing one another across the laser discharge 144 to form a resonator. The radius of curvature of the mirror surfaces are chosen firstly such that the resonator can be described as unstable in the free-space direction. This unstable requirement is met when the resonator free-space geometrical parameter product, g1*g2, is outside of the boundaries:

$$0 \leq g1 \cdot g2 \leq 1$$

Where g1=1−L/R1 and g2=1−L/R2, L being the separation of the mirrors across the discharge, and R1 being the free-space mirror radius of curvature for mirror 184, and R2 being the free-space mirror radius of curvature for mirror 194. The second requirement for the free-space resonator is that the optical axis formed by the free-space radius of curvatures belonging to mirrors 184 and 194 is parallel to the major axis T of the gas discharge 144; this aids in efficient extraction of gain from the gas discharge. The optical axis of the free-space resonator is defined as the axis O running through the two centres of the radius of curvature for mirrors 184 and 194. In FIG. 4 the centre of the radius of curvature for mirror 184 is at position 354, the centre of the radius of curvature for mirror 194 is at position 364. The third requirement for the free-space resonator is that it's confocal or near confocal, this requirement also aids in efficient extraction of gain from the gas discharge. This requirement is met when the focal points belonging to the free-space resonator mirrors 184 and 194 intersect each other. In FIG. 4 the confocal intersection point of the resonator is 304, and the focal points of the mirrors 184 and 194 are respectively 374 and 384 and are midway along the respective lines joining the centre of radius of curvatures with their mirror surfaces.

Up to this point in the discussion, the requirements put forward are also shared by a conventional confocal asymmetric negative branch resonator, as presented in the prior art of U.S. Pat. Nos. 5,048,048 and 5,335,242. However, in a departure from the conventional design, the laser resonator beam of the present invention exits past a hard edge 204 that is machined on the resonator mirror 194 that has the largest radius of curvature in the free-space unstable direction, the exact opposite of a conventional design. This results in the exiting beam 294 in the free-space unstable direction being divergent rather than collimated as is the case of a conventional asymmetric negative branch resonator, the geometric origin of the diverging beam being the confocal intersection point 304 of the resonator. The ideal width Q of the discharge in the free-space direction that is enclosed by the resonator mirrors 184 and 194 is related to the magnification M of the free-space resonator and the discharge width W by the following expression:

$$Q = W/M$$

where the magnification M, of the free-space resonator, is defined as the ratio R2/R1. Finally, in order to further the efficient extraction of gain from the discharge, a fifth requirement for the free-space resonator is that the optical axis O of the free-space resonator is shifted with respect to the discharge major axis T. This shift of the axis is in a direction away from the hard-edge 204 that is machined on the resonator mirror 194. The offset S of the optical axis O of the free-space unstable resonator is defined with respect to the hard edge 204 of resonator mirror 194 given by the following expression:

$$S = W/(M^2 + M)$$

Figure 5:
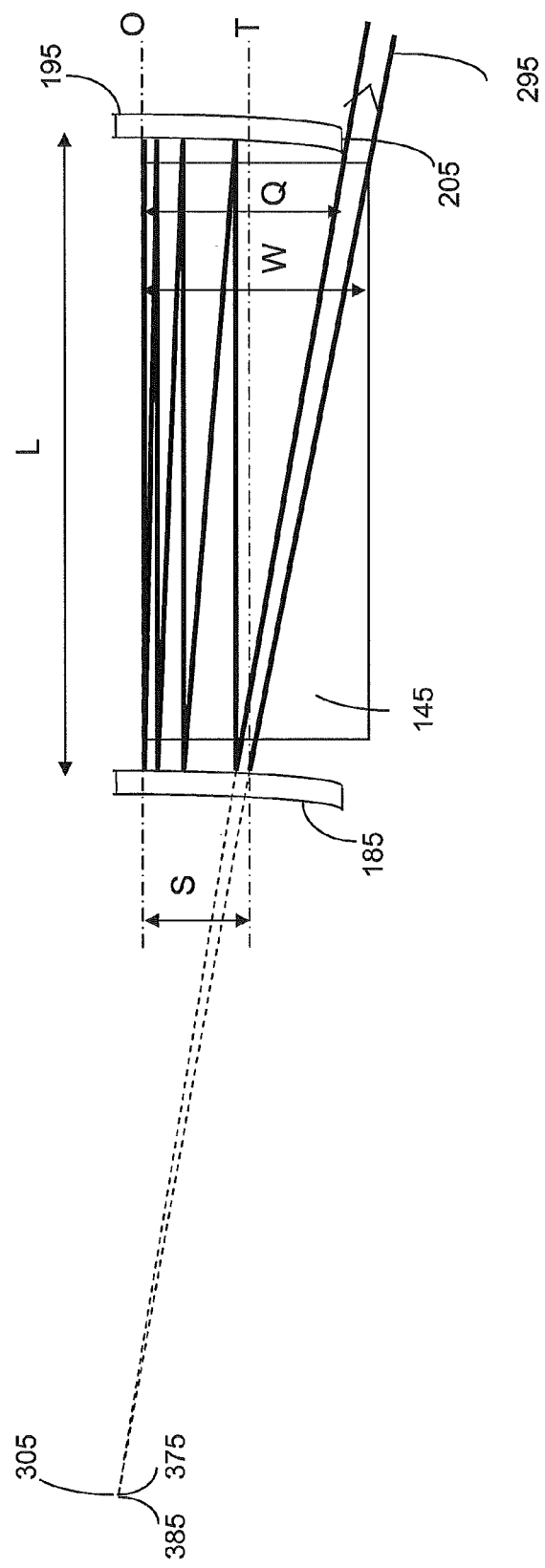
FIG. 5 is a plan view of the invented asymmetric hybrid planar waveguide resonator operating in the positive branch confocal configuration.

FIG. 5 shows the equivalent plan view of a positive branch resonator of the invention with the corrective third mirror of the invention not shown. Again, as was the case for negative branch equivalent, there are five requirements. In the free-space direction a confocal or near confocal asymmetric resonator operates, formed between two mirrors 185 and 195 with a radius of curvature formed on each mirror, the formed surfaces facing one another across the laser discharge 145 to form a resonator. The radius of curvature of the mirror surfaces are chosen firstly such that the resonator can be described as unstable in the free-space direction. This unstable requirement is met when the resonator free-space geometrical parameter product, g1*g2, is outside of the boundaries:

$$0 \leq g1 \cdot g2 \leq 1$$

Where g1=1−L/R1 and g2=1−L/R2, L being the separation of the mirrors across the discharge, and R1 being the free-space mirror radius of curvature for mirror 185, and R2 being the free-space mirror radius of curvature for mirror 195. In this instance, the mirror surface of 185 is convex, leading to R1 having a negative value. The second requirement for the free-space resonator is that the optical axis formed by the free-space radius of curvatures belonging to mirror's 185 and 195 is parallel to the major axis T of the gas discharge 145; this aids in efficient extraction of gain from the gas discharge. The optical axis of the free-space unstable resonator is defined as the axis O running through the two centres of the radius of curvature for mirrors 185 and 195. In FIG. 5 the centre of the radius of curvatures for mirror 185 and 195 lie at a position to the left of the figure. The third requirement for the free-space resonator is that it's confocal or near confocal, this requirement also aids in efficient extraction of gain from the gas discharge. This requirement is met when the focal points belonging to the free-space unstable resonator mirrors 185 and 195 intersect each other. In FIG. 5 the confocal intersection point of the resonator is 305, and the focal points of the mirrors 185 and 195 are respectively 375 and 385 and are midway along the respective lines joining the centre of radius of curvatures with their mirror surfaces.

Up to this point in the discussion, the requirements put forward are also shared by a conventional confocal asymmetric positive branch resonator, as presented in the prior art of U.S. Pat. No. 4,719,639. However, in a departure from the conventional design, the laser resonator beam of the present invention exits past a hard edge 205 that is machined on the resonator mirror 195 that has a concave radius of curvature in the free-space unstable direction, the exact opposite of a conventional design which has the hard edge machined on the resonator mirror with a convex radius of curvature. This results in the exiting beam 295 from the resonator in the free-space unstable direction being slightly divergent rather than collimated as is the case of a conventional asymmetric positive branch resonator, the geometric origin of the diverging beam being the confocal intersection point 305 of the resonator. The ideal width Q of the discharge in the free-space direction that is enclosed by the resonator mirrors 185 and 195 is related to the magnification M of the free-space resonator and the discharge width W by the following expression:

$$Q=W/M$$

where magnification M, of the free-space resonator, is defined as the ratio $-R2/R1$. Finally, in order to further the efficient extraction of gain from the discharge, a fifth requirement for the free-space resonator is that the optical axis O of the free-space resonator is shifted with respect to the discharge major axis T. This shift of the axis is in a direction away from the hard-edge 205 that is machined on the resonator mirror 195. The offset S of the optical axis O of the free-space unstable resonator is such that the optical axis O runs co-axial with the discharge longitudinal edge that is furthest from the hard edge 205 of resonator mirror 195.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A gas laser device comprising: two substantially parallel electrode plates forming a waveguide operable to focus and reflect a laser resonator beam; excitation means operable to cause a gas discharge; first and second reflecting means facing each other between the electrode plates to form a resonator, respective radii of curvature and a separation of the first and second reflecting means being such that the resonator in the free space plane parallel to the electrode plates is unstable and substantially confocal, and wherein said second reflecting means has a hard edge and has a radius of curvature in the free-space unstable direction that is greater than the radius of curvature of the first reflecting means; and third reflecting means, physically distinct from the first and second reflecting means, directing light through an additional waveguide element to an exit of the gas laser; wherein the additional waveguide element is external to the resonator and located between the third reflecting means and the exit of the gas laser, wherein the third reflecting means is adjacent one end of the resonator and the exit of the gas laser is adjacent an opposite end of the resonator.

2. A gas laser device as claimed in claim 1, characterized by being adapted to out-couple the resonator beam past the second reflecting means, the latter having a radius of curvature such that the exit beam is divergent and exits at an angle to a longitudinal axis of the unstable resonator.

3. A gas laser device as claimed in claim 1, wherein the third reflecting means are operable to focus the resonator exit beam substantially at an exit of the additional waveguide element to form a beam waist in the free space direction substantially the same size as a beam waist formed in the orthogonal waveguide direction.

4. A gas laser device as claimed in claim 3, further including spatial filtering means operable to shape the beam for use and located substantially at the exit of the additional waveguide element and adapted to remove side lobes in the free space direction to thereby generate a diffraction limited round beam internal to the laser gas device.

5. A gas laser device as claimed in claim 1, wherein the third reflecting means are operable to focus the resonator exit beam in the free space direction beyond the exit of the additional waveguide element.

6. A gas laser device as claimed in claim 5, further including spatial filtering means placed substantially at the free space beam waist and adapted to remove side lobes of the beam in the free space direction to thereby generate a diffraction limited beam.

7. A gas laser device as claimed in claim 5, further including an optical element that is located where the orthogonal free space and waveguide beam sizes are substantially the same, and has an optical power such that the different divergences in the orthogonal directions are made substantially the same, thereby generating a round diffraction limited beam.

8. A gas laser device as claimed in claim 5, further including a spatial filter means and an optical element.

9. A gas laser device as claimed in claim 1, wherein the additional waveguide element is adjacent to and coplanar with the waveguide formed by the electrode plates.

10. A gas laser device as claimed in claim 1, wherein the third reflecting means are adjustable in angle.

11. A gas laser device as claimed in claim 1, wherein the first and second reflecting means have radii of curvature to form a near confocal resonator in the plane parallel to the electrode plates.

12. A gas laser device as claimed in claim 1, wherein a discharge is created by radio frequency excitation of the gas contained within the gap between the substantially parallel electrode plates.

13. A gas laser device comprising: two substantially parallel electrode plates forming a waveguide operable to focus and reflect a laser resonator beam; excitation means operable to cause a gas discharge; first and second reflecting means facing each other between the electrode plates to form a resonator, respective radii of curvature and a separation of the first and second reflecting means being such that the resonator in the free space plane parallel to the electrode plates is unstable and substantially confocal, and wherein said second reflecting means has a hard edge and a concave radius of curvature in the free-space unstable direction; and third reflecting means, physically distinct from the first and second reflecting means, directing light through an additional waveguide element to an exit of the gas laser; wherein the additional waveguide element is external to the resonator and located between the third reflecting means and the exit of the gas laser, wherein the third reflecting means is adjacent the hard edge and the exit of the gas laser is adjacent an opposite end of the resonator.

* * * * *